United States Patent
Tang et al.

(10) Patent No.: US 10,525,836 B2
(45) Date of Patent: Jan. 7, 2020

(54) MOTOR DRIVING APPARATUS AND ELECTRIC VEHICLE

(71) Applicant: HUAWEI TECHNOLOGIES CO., LTD., Shenzhen, Guangdong (CN)

(72) Inventors: Jie Tang, Xi'an (CN); Lizhou Yang, Xi'an (CN); Jie Yi, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/115,892

(22) Filed: Aug. 29, 2018

(65) Prior Publication Data

US 2018/0361871 A1 Dec. 20, 2018

Related U.S. Application Data

(63) Continuation of application No. PCT/CN2016/090078, filed on Jul. 14, 2016.

(30) Foreign Application Priority Data

Feb. 29, 2016 (CN) .......................... 2016 1 0113632

(51) Int. Cl.
*B60L 50/50* (2019.01)
*B60L 11/18* (2006.01)
(Continued)

(52) U.S. Cl.
CPC ......... *B60L 11/1864* (2013.01); *B60L 15/007* (2013.01); *B60L 50/50* (2019.02);
(Continued)

(58) Field of Classification Search
USPC ....................................................... 318/139
See application file for complete search history.

(56) References Cited

U.S. PATENT DOCUMENTS 5,083,067 A * 1/1992 Soushin .................... H02P 6/24
318/400.26
5,955,861 A * 9/1999 Jeong .................... H02P 25/089
318/701
(Continued)

FOREIGN PATENT DOCUMENTS

CN 101323262 A 12/2008
CN 102638037 A 8/2012
(Continued)

OTHER PUBLICATIONS

Ohinese Office Action issued in Chinese Application No. 201610113632.8 dated Nov. 5, 2018, 10 pages.
(Continued)

*Primary Examiner* — Bentsu Ro
(74) *Attorney, Agent, or Firm* — Fish & Richardson P.C.

(57) ABSTRACT

A motor driving apparatus incudes a driving circuit outputting a three-phase alternating current and a main controller, wherein the driving circuit comprises a U-phase electric driving circuit, a V-phase electric driving circuit, and a W-phase electric driving circuit, each of the electric driving circuits comprises n storage batteries and n corresponding electric driving, and wherein input ends of the n electric driving units are connected to the corresponding storage batteries and output ends of the n electric driving units are cascaded to output one phase of the three-phase alternating current. The main controller is connected to signal ends of the n electric driving units and determines an output voltage adjustment coefficient of each of the n electric driving units in the electric driving circuit based on voltages of the n storage batteries in the electric driving circuit, and outputs the output voltage adjustment coefficient to the corresponding electric driving unit.

9 Claims, 6 Drawing Sheets

(51) Int. Cl.
  *B60L 15/00* (2006.01)
  *H02M 7/49* (2007.01)
  *H02M 7/483* (2007.01)
  *B60L 50/51* (2019.01)
  *B60L 58/18* (2019.01)
  *B60L 58/19* (2019.01)
  *B60L 58/12* (2019.01)
  *B60L 58/21* (2019.01)

(52) U.S. Cl.
  CPC .............. *B60L 50/51* (2019.02); *B60L 58/12* (2019.02); *B60L 58/18* (2019.02); *B60L 58/19* (2019.02); *B60L 58/21* (2019.02); *H02M 7/483* (2013.01); *H02M 7/49* (2013.01); *B60L 2240/429* (2013.01); *B60L 2240/547* (2013.01); *H02M 2007/4835* (2013.01); *Y02T 10/7005* (2013.01); *Y02T 10/7275* (2013.01)

(56) References Cited

U.S. PATENT DOCUMENTS

| | | |
|---|---|---|
| 9,142,977 B1 | 9/2015 | Chang et al. |
| 2013/0314013 A1 | 11/2013 | Ajima et al. |
| 2014/0001986 A1 | 1/2014 | Fink |
| 2014/0340047 A1 | 11/2014 | Weissenborn et al. |
| 2014/0358350 A1 | 12/2014 | Schmidt et al. |
| 2016/0107533 A1 | 4/2016 | Cai et al. |

FOREIGN PATENT DOCUMENTS

| | | |
|---|---|---|
| CN | 103427762 A | 12/2013 |
| CN | 104053571 A | 9/2014 |
| CN | 104494462 A | 4/2015 |
| CN | 104953675 A | 9/2015 |
| CN | 105305596 A | 2/2016 |
| DE | 102011089309 A1 | 6/2013 |
| DE | 102012202868 A1 | 8/2013 |
| DE | 102012210910 A1 | 1/2014 |
| DE | 102013206942 A1 | 10/2014 |
| JP | 2004208435 A | 7/2004 |
| JP | 2010035279 A | 2/2010 |

OTHER PUBLICATIONS

International Search Report issued in International Application No. PCT/CN2016/090078 dated Nov. 25, 2016, 12 pages.
Extended European Search Report issued in European Application No. 16892264.9 dated Jan. 22, 2019, 9 pages.
Office Action issued in Chinese Application No. 201610113632.8 dated Nov. 4, 2019, 7 pages.

* cited by examiner

MOTOR DRIVING APPARATUS AND ELECTRIC VEHICLE

CROSS-REFERENCE TO RELATED APPLICATIONS

This application is a continuation of International Application No. PCT/CN2016/090078, filed on Jul. 14, 2016, claims priority to Chinese Patent Application No. 201610113632.8, filed on Feb. 29, 2016. The disclosures of the aforementioned applications are hereby incorporated by reference in their entireties.

TECHNICAL FIELD

The present application relates to the field of automatic control technologies, and in particular, to a motor driving apparatus and an electric vehicle.

BACKGROUND

In the prior art, a motor driving apparatus in a device such as an electric vehicle mainly includes a series-connected battery group 101 and a three-phase inverter 102, as shown in FIG. 1.

However, different initial capacities, internal resistances, self-discharge rates, and the like of storage batteries in the series-connected battery group 101 lead to a difference between charge/discharge characteristics of the storage batteries, and the difference further widens after the storage batteries are charged and discharged for a plurality of times, resulting in a decrease in a storage battery capacity and output power, and a relatively low storage battery utilization.

SUMMARY

Embodiments of the present application provide a motor driving apparatus and an electric vehicle, to improve storage battery utilization.

A motor driving apparatus provided in an embodiment of the present application includes a driving circuit outputting a three-phase alternating current and a main controller, where the driving circuit includes a U-phase electric driving circuit, a V-phase electric driving circuit, and a W-phase electric driving circuit; and each of the electric driving circuits includes n storage batteries and n electric driving units in one-to-one correspondence with the n storage batteries, signal ends of the n electric driving units are connected to the main controller, input ends of the n electric driving units are connected to the corresponding storage batteries, and output ends of the n electric driving units are cascaded to output one phase of the three-phase alternating current, where n is a positive integer; and the main controller determines, for each electric driving circuit in the driving circuit, an output voltage adjustment coefficient of each of the n electric driving units in the electric driving circuit based on voltages of the n storage batteries in the electric driving circuit, and outputs the output voltage adjustment coefficient to the corresponding electric driving unit.

In a specific embodiment of the present application, each electric driving unit includes an H-bridge inverter and a unit controller, where an input end of the H-bridge inverter serves as an input end of the corresponding electric driving unit, and an output end of the H-bridge inverter serves as an output end of the corresponding electric driving unit; and a signal end of the unit controller serves as a signal end of the corresponding electric driving unit; and the unit controller samples a voltage of a storage battery connected to the corresponding electric driving unit, sends the voltage to the main controller, and adjusts an output voltage of the H-bridge inverter based on the output voltage adjustment coefficient of the corresponding electric driving unit determined by the main controller.

In a specific embodiment of the present application, the main controller specifically determines, for each electric driving circuit in the driving circuit, an average voltage of the n storage batteries in the electric driving circuit, and determines the output voltage adjustment coefficient of each of the n electric driving units in the electric driving circuit based on the average voltage.

In actual implementation, the main controller may specifically determine, for each of the n electric driving units in the electric driving circuit, a ratio of a voltage of the corresponding storage battery to the average voltage as the voltage adjustment coefficient of the electric driving unit.

Preferably, before determining, for each electric driving circuit in the driving circuit, the output voltage adjustment coefficient of each of the n electric driving units in the electric driving circuit based on the voltages of the n storage batteries in the electric driving circuit, the main controller further determines whether the driving circuit outputs normally. To be specific, when determining that the driving circuit outputs normally, the main controller determines the output voltage adjustment coefficient of each electric driving unit; when determining that the driving circuit outputs abnormally, the main controller does not determine the output voltage adjustment coefficient of each electric driving unit.

Preferably, each electric driving circuit in the driving circuit further includes n bypass switch units in one-to-one correspondence with the n electric driving units, and each of the n bypass switch units is connected between output ends of the corresponding electric driving unit. In this case, the main controller may further determine whether a back electromotive force of a motor is greater than a preset value, and when determining that the back electromotive force of the motor is greater than the preset value, controls the bypass switch units of each electric driving circuit in the driving circuit to be in a closed state.

In actual implementation, the bypass switch unit may be implemented by using a contactor and a bidirectional thyristor, and includes at least one of the contactor and the bidirectional thyristor.

Preferably, before determining whether the back electromotive force of the motor is greater than the preset value, the main controller further determines whether the driving circuit outputs abnormally. To be specific, when determining that the driving circuit outputs abnormally, the main controller determines whether the back electromotive force of the motor is greater than the preset value; when determining that the driving circuit outputs normally, the main controller does not determine whether the back electromotive force of the motor is greater than the preset value.

An electric vehicle provided in an embodiment of the present application includes an automobile motor converting electric energy into mechanical energy and any foregoing motor driving apparatus configured to drive the automobile motor.

According to the motor driving apparatus and the electric vehicle provided in the embodiments of the present application, the storage batteries independently output power without affecting each other, and output of the corresponding electric driving units is adjusted based on the voltages of the storage batteries, so that a high-voltage storage battery outputs more electric energy and a low-voltage storage battery outputs less electric energy. This implements a storage battery voltage equalization effect and improves storage battery utilization.

BRIEF DESCRIPTION OF DRAWINGS

The accompanying drawings are used for further understanding of the present application, and constitute a part of the specification. The accompanying drawings are used with the embodiments of the present application to explain the present application, but do not constitute any limitation to the present application. In the accompanying drawings.

DESCRIPTION OF EMBODIMENTS

To provide an implementation solution for improving storage battery utilization, the embodiments of the present application provide a motor driving apparatus and an electric vehicle. The following describes embodiments of the present application with reference to the accompanying drawings of this specification. It should be understood that the preferred embodiments described herein are merely used to describe and explain the present application, but are not intended to limit the present application. The embodiments in this application and features in the embodiments may be combined without conflicts.

Figure 1:
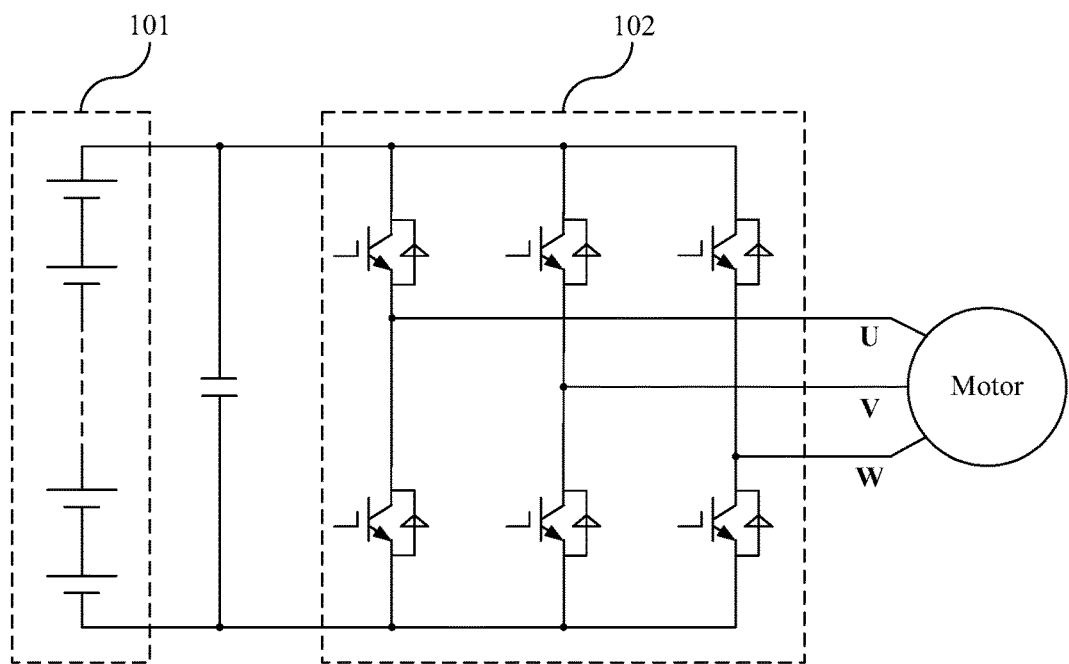
FIG. 1 is a schematic structural diagram of a motor driving apparatus in the prior art.
Figure 2:
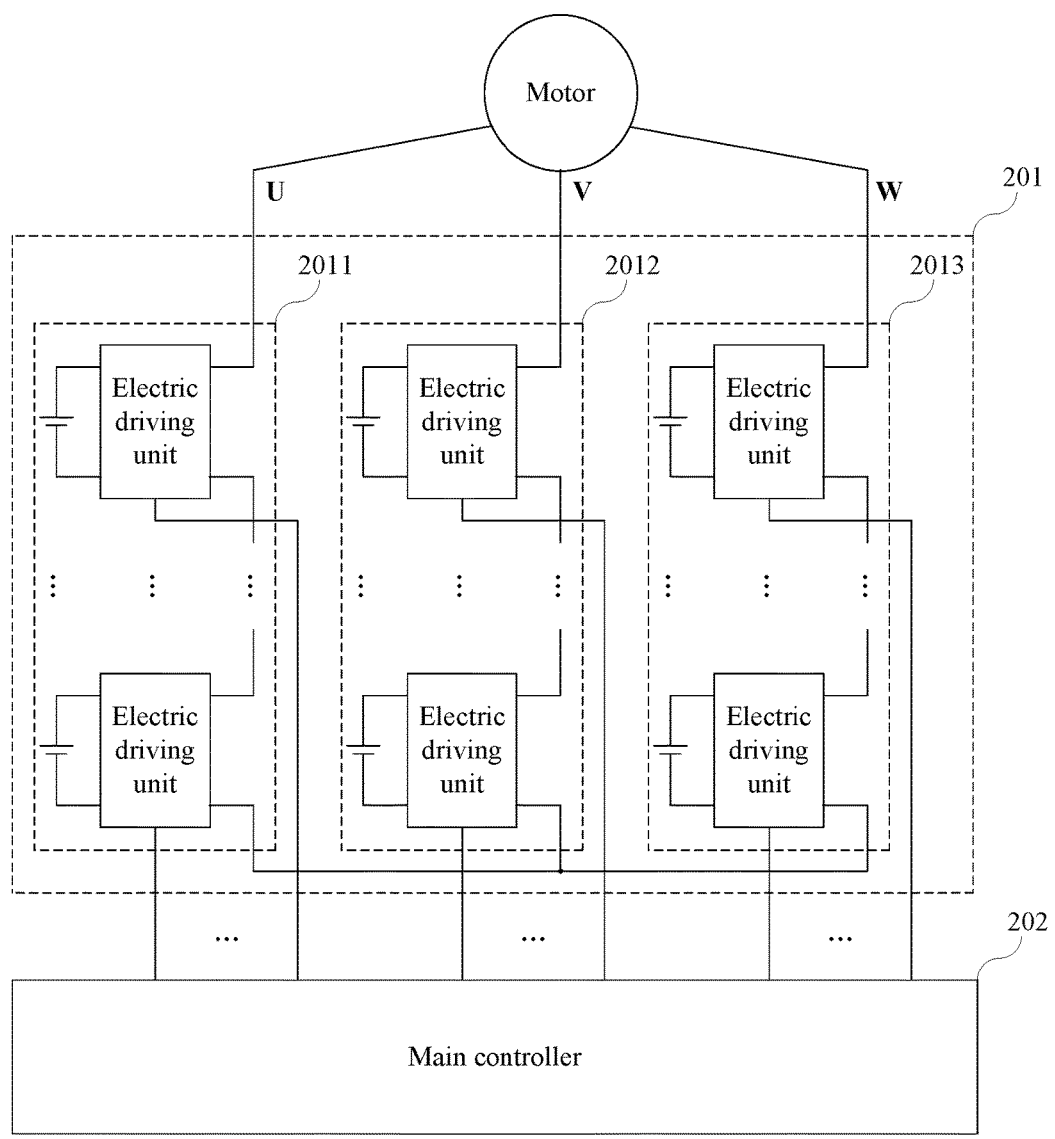
FIG. 2 is a first schematic structural diagram of a motor driving apparatus according to an embodiment of the present application.

An embodiment of the present application provides a motor driving apparatus. As shown in FIG. 2, the motor driving apparatus may specifically include a driving circuit 201 outputting a three-phase alternating current and a main controller 202.

The driving circuit 201 includes a U-phase electric driving circuit 2011, a V-phase electric driving circuit 2012, and a W-phase electric driving circuit 2013. Each of the electric driving circuits includes n storage batteries and n electric driving units in one-to-one correspondence with the n storage batteries, signal ends of the n electric driving units are connected to the main controller 202, input ends of the n electric driving units are connected to the corresponding storage batteries, and output ends of the n electric driving units are cascaded, to output one phase of the three-phase alternating current, where n is a positive integer.

The main controller 202 determines, for each electric driving circuit in the driving circuit 201, an output voltage adjustment coefficient of each of the n electric driving units in the electric driving circuit based on voltages of the n storage batteries in the electric driving circuit, and outputs the output voltage adjustment coefficient to the corresponding electric driving unit.

To be specific, in the motor driving apparatus provided in this embodiment of the present application, the U-phase electric driving circuit 2011 in the driving circuit 201 outputs a U-phase of the three-phase alternating current of a driving motor, the V-phase electric driving circuit 2012 outputs a V-phase of the three-phase alternating current of the driving motor, and the W-phase electric driving circuit 2013 outputs a W-phase of the three-phase alternating current of the driving motor.

The electric driving unit in each electric driving circuit includes a signal end, two input ends including a positive input end and a negative input end, and two output ends including a first output end and a second output end.

In each electric driving circuit, the signal ends of the n electric driving units are connected to the main controller 202.

To be specific, signal ends of n electric driving units in the U-phase electric driving circuit 2011, signal ends of n electric driving units in the V-phase electric driving circuit 2012, and signal ends of n electric driving units in the W-phase electric driving circuit 2013 are connected to the controller 202.

In each electric driving circuit, input ends of the n electric driving units are connected to corresponding storage batteries.

To be specific, a positive input end of an $i^{th}$ electric driving unit in the U-phase electric driving circuit 2011 is connected to a positive electrode of an $i^{th}$ storage battery in the U-phase electric driving circuit 2011, and a negative input end of the $i^{th}$ electric driving unit in the U-phase electric driving circuit 2011 is connected to a negative electrode of the $i^{th}$ storage battery in the U-phase electric driving circuit 2011, where i is a positive integer less than n;

a positive input end of a $j^{th}$ electric driving unit in the V-phase electric driving circuit 2012 is connected to a positive electrode of a $j^{th}$ storage battery in the V-phase electric driving circuit 2012, and a negative input end of the $j^{th}$ electric driving unit in the V-phase electric driving circuit 2012 is connected to a negative electrode of the $j^{th}$ storage battery in the V-phase electric driving circuit 2012, where j is a positive integer less than n; and a positive input end of a $k^{th}$ electric driving unit in the W-phase electric driving circuit 2013 is connected to a positive electrode of a $k^{th}$ storage battery in the W-phase electric driving circuit 2013, and a negative input end of the $k^{th}$ electric driving unit in the W-phase electric driving circuit 2013 is connected to a negative electrode of the $k^{th}$ storage battery in the W-phase electric driving circuit 2013, where k is a positive integer less than n.

In each electric driving circuit, output ends of the n electric driving units are cascaded, to output one phase of the three-phase alternating current.

To be specific, a first output end of a first electric driving unit in the U-phase electric driving circuit 2011 serves as a first output end of the U-phase electric driving circuit 2011 and is configured to be connected to a U-phase wiring end of the motor; a first output end of a first electric driving unit in the V-phase electric driving circuit 2012 serves as a first output end of the V-phase electric driving circuit 2012 and is configured to be connected to a V-phase wiring end of the motor; and a first output end of a first electric driving unit in the W-phase electric driving circuit 2013 serves as a first output end of the W-phase electric driving circuit 2013 and is configured to be connected to a W-phase wiring end of the motor;

a second output end of the $i^{th}$ electric driving unit in the U-phase electric driving circuit 2011 is connected to a first output end of an $(i+1)^{th}$ electric driving unit in the U-phase electric driving circuit 2011; a second output end of the $j^{th}$ electric driving unit in the V-phase electric driving circuit 2012 is connected to a first output end of a $(j+1)^{th}$ electric driving unit in the V-phase electric driving circuit 2012; and a second output end of the $k^{th}$ electric driving unit in the W-phase electric driving circuit 2013 is connected to a first output end of a $(k+1)^{th}$ electric driving unit in the W-phase electric driving circuit 2013; and a second output end of an $n^{th}$ electric driving unit in the U-phase electric driving circuit 2011, a second output end of an $n^{th}$ electric driving unit in the V-phase electric driving circuit 2012, and a second output end of an $n^{th}$ electric driving unit in the W-phase electric driving circuit 2013 constitute an N point of the driving circuit 201.

Figure 3:
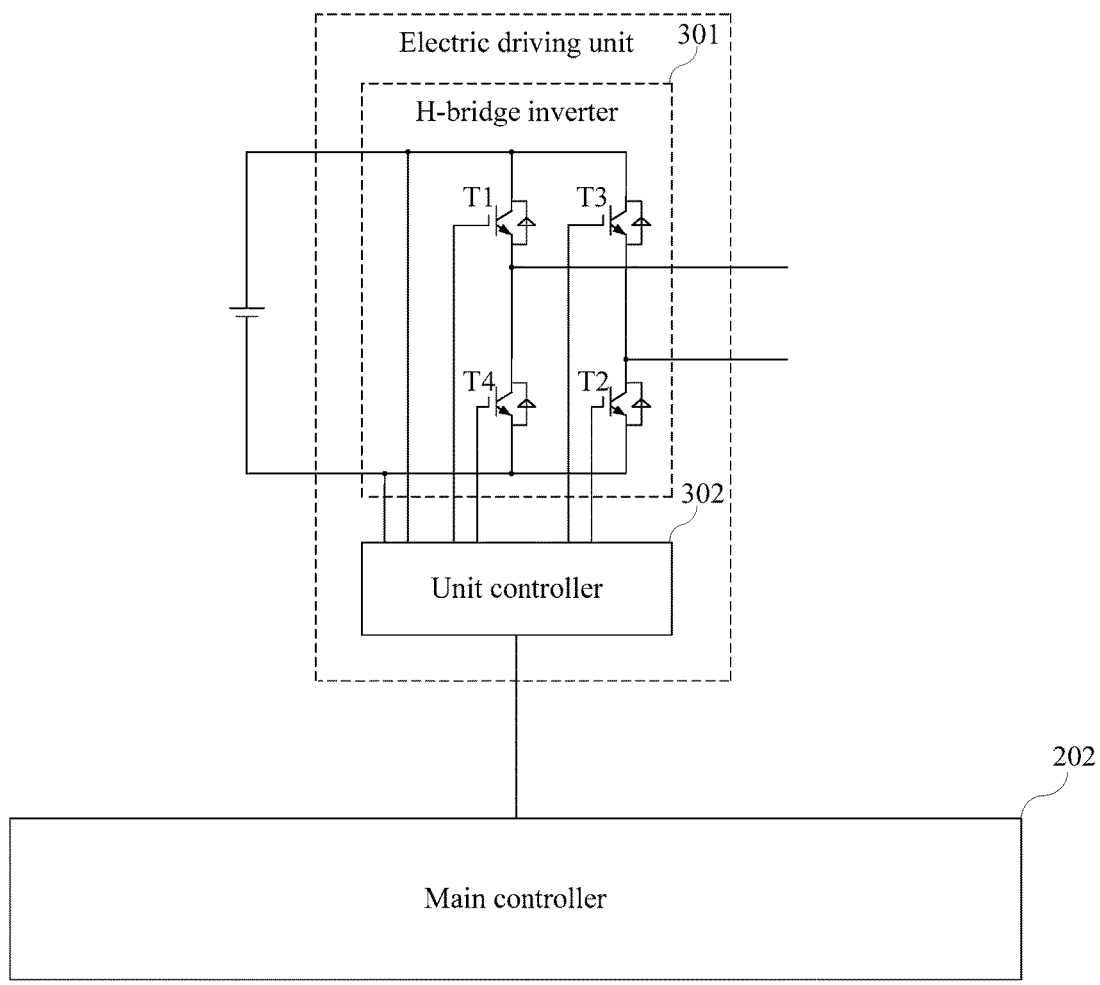
FIG. 3 is a schematic structural diagram of an electric driving unit according to an embodiment of the present application.

Optionally, the electric driving unit may specifically include an H-bridge inverter 301 and a unit controller 302, as shown in FIG. 3.

An input end of the H-bridge inverter 301 serves as an input end of the corresponding electric driving unit, and an output end of the H-bridge inverter 301 serves as an output end of the corresponding electric driving unit.

A signal end of the unit controller 302 serves as a signal end of the corresponding electric driving unit. The unit controller 302 samples a voltage of a storage battery connected to the corresponding electric driving unit, sends the voltage to the main controller 202, and adjusts an output voltage of the H-bridge inverter 301 based on the output voltage adjustment coefficient of the corresponding electric driving unit determined by the main controller 202.

The H-bridge inverter 301 specifically includes a first IGBT module T1, a second IGBT module T2, a third IGBT module T3, and a fourth IGBT module T4. A wiring end for connecting a collector of the first IGBT module T1 and a collector of the third IGBT module T3 serves as a positive input end of the H-bridge inverter 301. A wiring end for connecting an emitter of the fourth IGBT module T4 and an emitter of the second IGBT module T2 serves as a negative input end of the H-bridge inverter 301. A wiring end for connecting an emitter of the first IGBT module T1 and a collector of the fourth IGBT module T4 serves as a first output end of the H-bridge inverter 301. A wiring end for connecting an emitter of the third IGBT module T3 and a collector of the second IGBT module T2 serves as a second output end of the H-bridge inverter 301.

A gate of the first IGBT module T1, a gate of the second IGBT module T2, a gate of the third IGBT module T3, and a gate of the fourth IGBT module T4 are connected to the unit controller 302. By controlling each IGBT module of the H-bridge inverter 301, the unit controller 302 adjusts, based on the output voltage adjustment coefficient of the corresponding electric driving unit determined by the main controller 202, the output voltage of the H-bridge inverter 301, that is, adjusts an output voltage of the electric driving unit.

In actual implementation, the main controller 202 may control the driving circuit 201 to output the three-phase alternating current, and on this basis, determine the output voltage adjustment coefficient of each electric driving unit in each electric driving circuit based on the voltages of the storage batteries in the electric driving circuit, so as to adjust the output voltage of each electric driving unit proportionally. Specifically, in each electric driving circuit, a lower voltage of the storage battery indicates a smaller determined output voltage adjustment coefficient of an electric driving unit corresponding to the storage battery and a lower adjusted-to output voltage of the electric driving unit corresponding to the storage battery, so that the storage battery outputs less electric energy. A higher voltage of the storage battery indicates a larger determined output voltage adjustment coefficient of the electric driving unit corresponding to the storage battery and a higher adjusted-to output voltage of the electric driving unit corresponding to the storage battery, so that the storage battery outputs more electric energy.

In a specific embodiment of the present application, the main controller 202 specifically determines, for each electric driving circuit in the driving circuit, an average voltage of the n storage batteries in the electric driving circuit, and determines the output voltage adjustment coefficient of each of the n electric driving units in the electric driving circuit based on the average voltage. For example, the main controller 202 may specifically determine, for each of the n electric driving units in the electric driving circuit, a ratio of a voltage of the corresponding storage battery to the average voltage as the voltage adjustment coefficient of the electric driving unit.

In another specific embodiment of the present application, the main controller 202 may specifically determine the output voltage adjustment coefficient of each of the n electric driving units in the electric driving circuit based on the voltages of the n storage batteries in the electric driving circuit by using another algorithm.

Obviously, according to the motor driving apparatus provided in this embodiment of the present application, the storage batteries independently output power without affecting each other, and output of the corresponding electric driving units is adjusted based on the voltages of the storage batteries, so that a high-voltage storage battery outputs more electric energy and a low-voltage storage battery outputs less electric energy. This implements a storage battery voltage equalization effect and improves a utilization and reliability of the storage batteries.

In addition, a plurality of electric driving units in each electric driving circuit of the motor driving apparatus are cascaded for output, and an output signal is a multilevel signal that approximates a sinusoid, so that a three-phase alternating current harmonic of a driving motor is smaller. This can effectively prolong a service life of the motor.

Preferably, before determining, for each electric driving circuit in the driving circuit 201, the output voltage adjustment coefficient of each of then electric driving units in the electric driving circuit based on the voltages of the n storage batteries in the electric driving circuit, the main controller 202 further determines whether the driving circuit outputs normally.

To be specific, before calculating the output voltage adjustment coefficients of the electric driving units, the main controller 202 first determines whether the driving circuit outputs normally. If determining that the driving circuit outputs normally, the main controller 202 calculates the output voltage adjustment coefficients of the electric driving units. If determining that the driving circuit outputs abnormally, the main controller 202 does not calculate the output voltage adjustment coefficients of the electric driving units. This can reduce a processing resource of the main controller 202.

Figure 4:
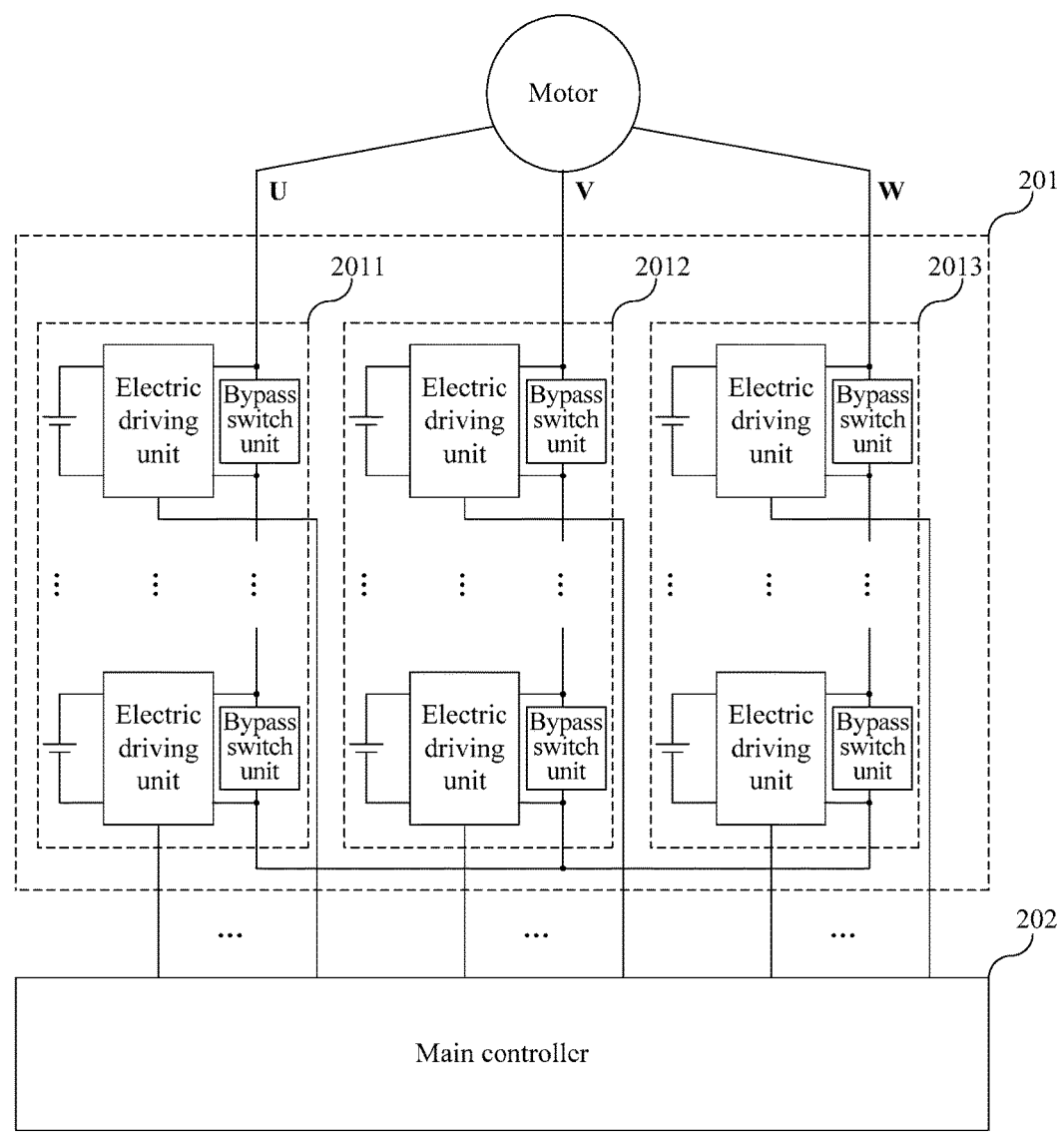
FIG. 4 is a second schematic structural diagram of a motor driving apparatus according to an embodiment of the present application.

Preferably, as shown in FIG. 4, each electric driving circuit in the driving circuit 201 of the motor driving apparatus provided in this embodiment of the present application further includes n bypass switch units in one-to-one correspondence with the n electric driving units, and each of the n bypass switch units is connected between output ends of the corresponding electric driving unit.

To be specific, $i^{th}$ bypass switch unit in the U-phase electric driving circuit is connected between two output ends of the $i^{th}$ electric driving unit in the U-phase electric driving circuit; a $j^{th}$ bypass switch unit in the V-phase electric driving circuit is connected between two output ends of the $j^{th}$ electric driving unit in the V-phase electric driving circuit; and a $k^{th}$ bypass switch unit in the W-phase electric driving circuit is connected between two output ends of the $k^{th}$ electric driving unit in the W-phase electric driving circuit.

In specific implementation, the bypass switch unit may include but is not limited to at least one of a contactor and a bidirectional thyristor. In other words, the bypass switch unit may be implemented by using the contactor, may be implemented by using the bidirectional thyristor, or may be implemented by using both the contactor and the bidirectional thyristor.

In this case, the main controller 202 may further determine whether a back electromotive force of the motor is greater than a preset value, and when determining that the back electromotive force of the motor is greater than the preset value, controls the bypass switch units of each electric driving circuit in the driving circuit 201 to be in a closed state.

When the electric driving units of each electric driving circuit in the driving circuit 201 are implemented in a structure shown in FIG. 3, the main controller 202 may output a bypass switch unit close instruction to the unit controller of the electric driving units when determining that the back electromotive force of the motor is greater than the preset value. The unit controller controls closing of a corresponding bypass switch unit to short-circuit an output end of the electric driving unit, thereby protecting the storage battery.

Preferably, before determining whether the back electromotive force of the motor is greater than the preset value, the main controller 202 further determines whether the driving circuit outputs abnormally.

Figure 5:
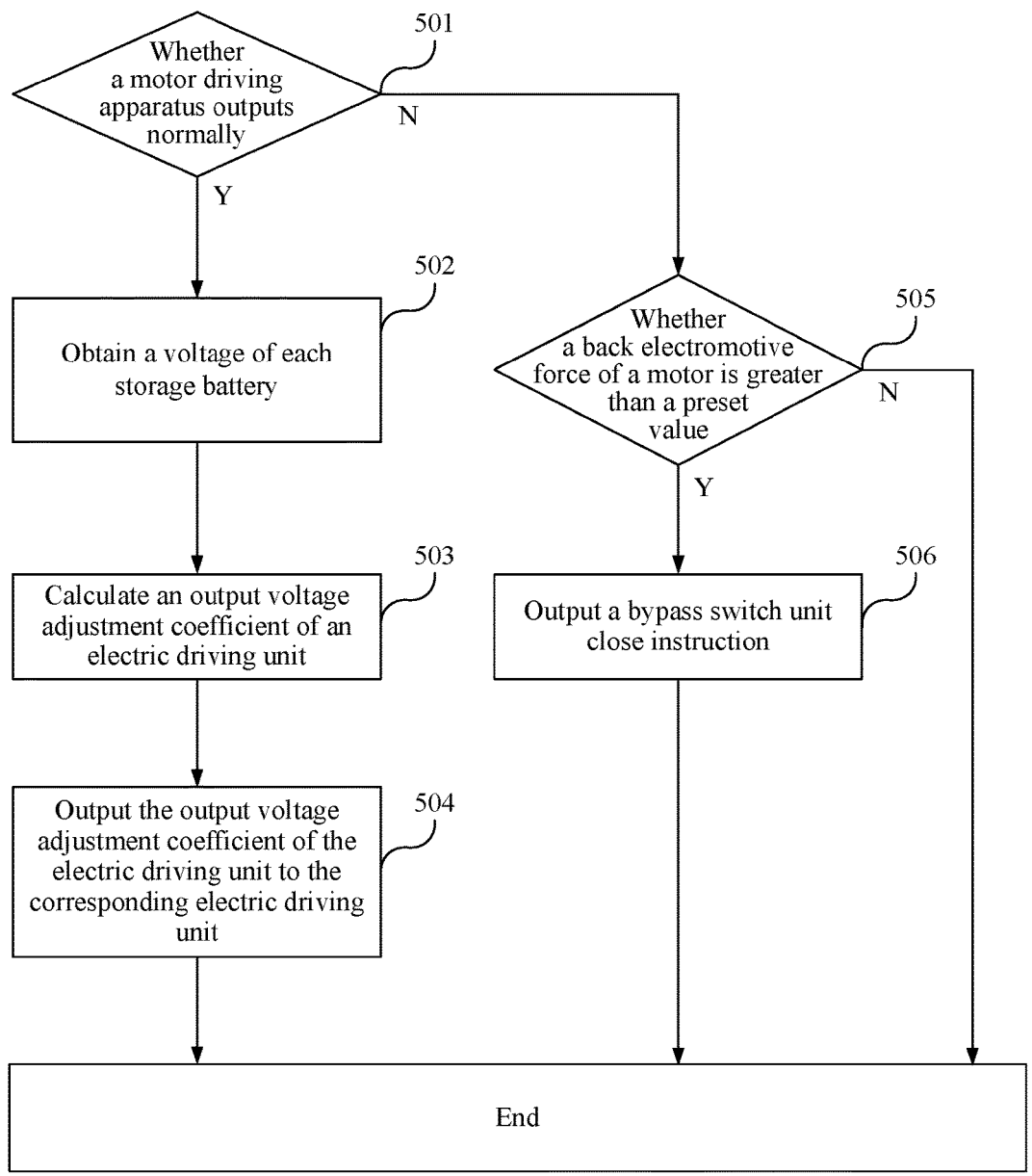
FIG. 5 is a schematic control flowchart of a main controller according to an embodiment of the present application.

In actual implementation, a processing procedure performed by the main controller 202 of the motor driving apparatus provided in this embodiment of the present application may include the following steps, as shown in FIG. 5.

Step 501: Determine whether the motor driving apparatus outputs normally.

When it is determined that the motor driving apparatus outputs normally, step 502 is performed; when it is determined that the motor driving apparatus outputs abnormally, step 505 is directly performed.

Step 502: Obtain a voltage of each storage battery.

Step 503: For each electric driving circuit, calculate an average voltage of the storage batteries in the electric driving circuit and a ratio of a voltage of each storage battery to the average voltage, namely, an output voltage adjustment coefficient of a corresponding electric driving unit.

Step 504: Output the output voltage adjustment coefficient of the electric driving unit to the corresponding electric driving unit, and instruct the electric driving unit to adjust an output voltage proportionally. The control procedure ends.

Step 505: Determine whether a back electromotive force of a motor is greater than a preset value.

When it is determined that the back electromotive force of the motor is greater than the preset value, step 506 is performed; when it is determined that the back electromotive force of the motor is not greater than the preset value, the control procedure ends.

Step 506: Output a bypass switch unit close instruction to control closing of each bypass switch unit.

In summary, according to the solution provided in this embodiment of the present application, a storage battery voltage equalization effect can be implemented, a utilization and reliability of the storage battery are improved, and a service life of the motor is prolonged.

Figure 6:
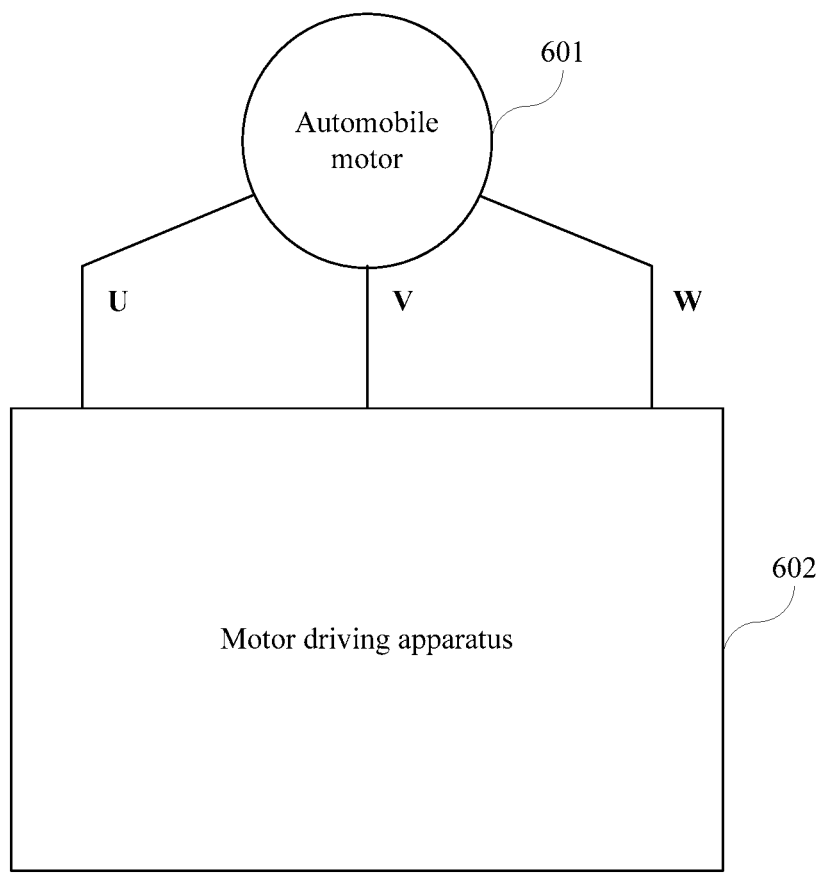
FIG. 6 is a schematic structural diagram of an electric vehicle according to an embodiment of the present application.

An embodiment of the present application further provides an electric vehicle, including an automobile motor 601 converting electric energy into mechanical energy and any foregoing motor driving apparatus 602 configured to drive the automobile motor, as shown in FIG. 6.

Certainly, the foregoing motor driving apparatus may be applied to another device with a motor, in addition to the electric vehicle. Examples are not illustrated herein.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the embodiments of the present application without departing from the scope of the embodiments of the present application. The present application is intended to cover these modifications and variations provided that they fall within the scope of protection defined by the following claims and their equivalent technologies.

What is claimed is:

1. A motor driving apparatus, comprising:
   a driving circuit outputting a three-phase alternating current, wherein the driving circuit comprises a U-phase electric driving circuit, a V-phase electric driving circuit, and a W-phase electric driving circuit, each of the electric driving circuits comprises n storage batteries and n electric driving units each has a one-to-one correspondence with the n storage batteries, and wherein input ends of the n electric driving units are connected to the corresponding storage batteries and output ends of then electric driving units are cascaded to output one phase of the three-phase alternating current, where n is a positive integer; and
   a main controller connecting to signal ends of the n electric driving units, wherein the main controller determines, for each electric driving circuit in the driving circuit, an output voltage adjustment coefficient of each of the n electric driving units in the electric driving circuit based on voltages of the n storage batteries in the electric driving circuit, and outputs the output voltage adjustment coefficient to the corresponding electric driving unit.

2. The motor driving apparatus according to claim 1, wherein each electric driving unit comprises an H-bridge inverter and a unit controller, wherein an input end of the H-bridge inverter serves as an input end of the corresponding electric driving unit and an output end of the H-bridge inverter serves as an output end of the corresponding electric driving unit, a signal end of the unit controller serves as a signal end of the corresponding electric driving unit, and wherein the unit controller samples a voltage of a storage battery connected to the corresponding electric driving unit, sends the voltage to the main controller, and adjusts an output voltage of the H-bridge inverter based on the output voltage adjustment coefficient of the corresponding electric driving unit determined by the main controller.

3. The motor driving apparatus according to claim 1, wherein the main controller determines, for each electric driving circuit in the driving circuit, an average voltage of the n storage batteries in the electric driving circuit and the output voltage adjustment coefficient of each of the n electric driving units in the electric driving circuit based on the average voltage.

4. The motor driving apparatus according to claim 3, wherein the main controller determines, for each of the n electric driving units in the electric driving circuit, a ratio of a voltage of a corresponding storage battery to the average voltage as the output voltage adjustment coefficient of the electric driving unit.

5. The motor driving apparatus according to claim 1, wherein before determining, for each electric driving circuit in the driving circuit, the output voltage adjustment coefficient of each of the n electric driving units in the electric driving circuit based on the voltages of the n storage batteries in the electric driving circuit, the main controller further determines whether the driving circuit outputs normally.

6. The motor driving apparatus according to claim 1, wherein each electric driving circuit in the driving circuit further comprises n bypass switch units each has a one-to-one correspondence with the n electric driving units, and each of the n bypass switch units is connected between output ends of the corresponding electric driving unit, and wherein the main controller further determines whether a back electromotive force of a motor is greater than a preset value, and when determining that the back electromotive force of the motor is greater than the preset value, controls at least a portion of the n bypass switch units of each electric driving circuit in the driving circuit to be in a closed state.

7. The motor driving apparatus according to claim 6, wherein the bypass switch unit comprises at least one of a contactor and a bidirectional thyristor.

8. The motor driving apparatus according to claim 6, wherein the main controller determines whether the driving circuit outputs abnormally before determining whether the back electromotive force of the motor is greater than the preset value.

9. An electric vehicle, comprising:
an automobile motor converting electric energy into mechanical energy, the electric vehicle includes a motor driving apparatus that comprises:
a driving circuit outputting a three-phase alternating current, wherein the driving circuit comprises a U-phase electric driving circuit, a V-phase electric driving circuit, and a W-phase electric driving circuit, each of the electric driving circuits comprises n storage batteries and n electric driving units each has a one-to-one correspondence with the n storage batteries, and wherein input ends of the n electric driving units are connected to the corresponding storage batteries and output ends of the n electric driving units are cascaded to output one phase of the three-phase alternating current, where n is a positive integer; and
a main controller connecting to signal ends of the n electric driving units, wherein the main controller determines, for each electric driving circuit in the driving circuit, an output voltage adjustment coefficient of each of the n electric driving units in the electric driving circuit based on voltages of the n storage batteries in the electric driving circuit, and outputs the output voltage adjustment coefficient to the corresponding electric driving unit.

* * * * *

UNITED STATES PATENT AND TRADEMARK OFFICE
CERTIFICATE OF CORRECTION

PATENT NO. : 10,525,836 B2
APPLICATION NO. : 16/115892
DATED : January 7, 2020
INVENTOR(S) : Jie Tang, Lizhou Yang and Jie Yi Page 1 of 1

It is certified that error appears in the above-identified patent and that said Letters Patent is hereby corrected as shown below:

On the Title Page

In Column 2, (Other Publications), Line 1, delete "Ohinese" and insert -- Chinese --, therefor.

In the Claims

In Column 8, Line 42, In Claim 1, delete "then" and insert -- the n --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*